Nov 24, 1953　　　　H. A. RAHMEL　　　2,660,663
SEARCH SIGNAL APPARATUS FOR DETERMINING THE LISTENING
HABITS OF WAVE SIGNAL RECEIVER USERS
Filed Oct. 24, 1947　　　　　　　　　　　　　4 Sheets-Sheet 1

Inventor
Henry A. Rahmel
By Mason & Wyss
Attys

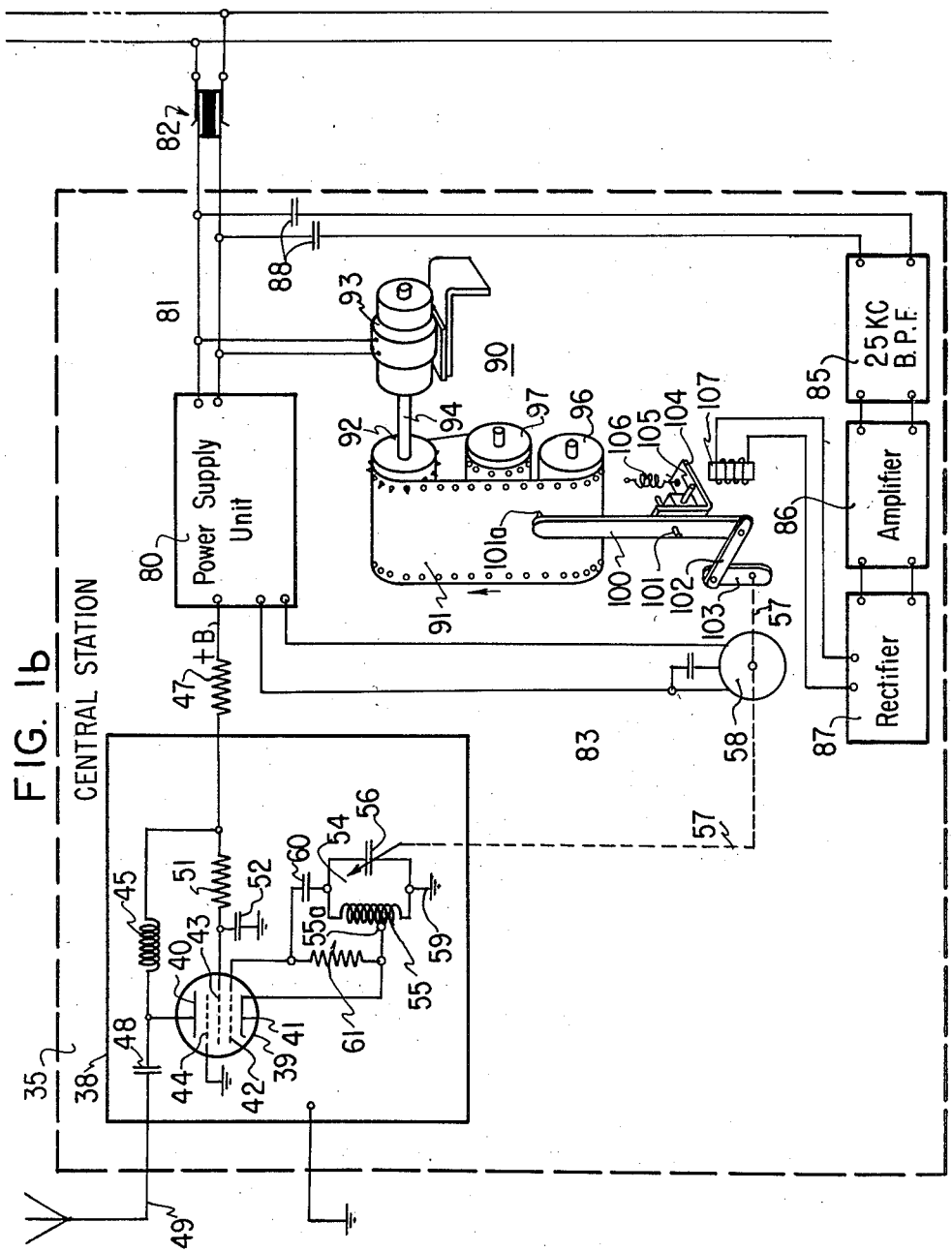

Inventor
Henry A. Rahmel
By Mason & Wyss
Attys.

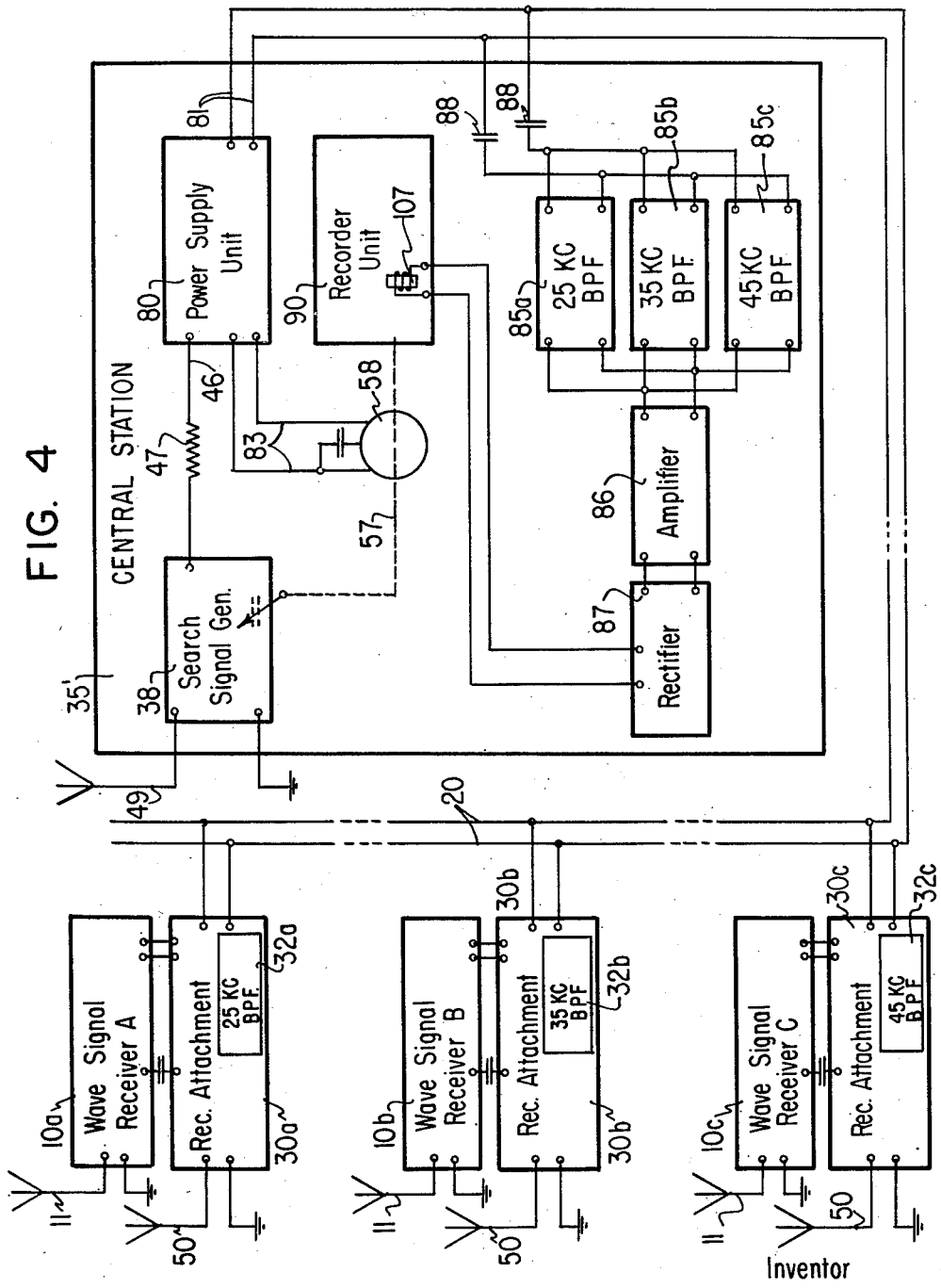

UNITED STATES PATENT OFFICE 2,660,663

SEARCH SIGNAL APPARATUS FOR DETERMINING THE LISTENING HABITS OF WAVE SIGNAL RECEIVER USERS

Henry A. Rahmel, Evanston, Ill., assignor to A. C. Nielsen Company, Chicago, Ill., a corporation of Illinois Application October 24, 1947, Serial No. 781,782

19 Claims. (Cl. 250—2)

The present invention relates broadly to a search signal type of device for determining the listening or viewing habits of users of wave signal receivers. More particularly the present invention relates to an improved instrumented method and apparatus for determining the audience popularity of different programs transmitted from one or more wave signal transmitters and for gathering other information of great importance in determining the effectiveness of radio advertising. Specifically the present invention is concerned with a search signal type of device for determining the listening habits of users of wave signal receivers including means for generating at a point preferably remote from the wave signal receiver being monitored or metered a search signal capable of producing a predetermined response when the wave signal receiver is tuned to a particular station corresponding to the frequency of the search signal at that instant, the time of the response during the search signal cycle being indicative of the tuning of the wave signal receiver.

Instrumented methods for determining the listening habits of home radio receiver users generally involve the use of a recording device operating in conjunction with each collaborator receiver used in the sampling system to record the extent of use of the receiver and to record as a function of time the wave signal transmitter to which the wave signal receiver is tuned for program reception. The usual device of this character embodies facilities for driving a movable recording element such as a movable paper tape, magnetic tape or wire or other recording tape or element in a predetermined manner, together with translating means for variably positioning suitable recording means such as a stylus or the like relative to the recording element in accordance with changes of the tuning of the wave signal receiver. If the recording element moves at a constant speed or in some determinable relationship with respect to time the record on the recording element not only provides information as to the particular transmitting station or stations to which the receiver is tuned but also gives accurate information with reference to the time such receiver is tuned to such various transmitting stations.

In general two different types of instrument have been used to produce a record of the extent of receiver use and the particular transmitters to which the receiver is tuned for program reception during a predetermined calendar period. The first or all mechanical type of device employs a mechanical connection between the control means for operating the resonant frequency varying device (which control means might be the tuning shaft of the ganged condensers of a receiver) and the recording stylus of the recorder. The recording stylus is moved transversely of the recording element in accordance with the angular setting imparted to the condenser tuning shaft whereby a record of the particular tuning condition of the receiver is obtained. If the tape is driven at a constant speed or in some other determinable manner with respect to time then a record of the tuning condition with respect to time is obtained. The connection between the recording means such as the stylus and the receiver tuning shaft dictates the positioning of the recorder in the receiver cabinet which bars its use in connection with small receivers having limited unoccupied cabinet space.

The second type of such instrument used heretofore might be termed an electromechanical device in that an electromechanical translating system is interposed between the high frequency signal channel of the receiver and the station recording stylus to control the movement of the stylus in its operation to record on a time basis the particular transmitters from which programs are received. The present invention is concerned with a device or instrument of the second type. Prior art instruments of the second type were principally of the wave meter construction wherein the local oscillator of the receiver was coupled to a sweeping wave meter through a small coupling capacitor. The coupling capacitor was usually located directly at the oscillator circuit of the receiver and a shielded or unshielded conductor was used to transmit the local oscillator output signal to the wave meter. Due to the signal attenuation over this channel the coupling conductor was of necessity relatively short, which meant that with the prior art devices the wave meter and recording instrument were required to be located within a relatively few feet of the receiver. Such prior art instruments of the wave meter type were furthermore rather bulky and consequently difficult to conceal or make inconspicuous in the average home. It is of course possible to use a highly sensitive wave meter with a long coupling conductor, but there are objections to running such a conductor along the floor or walls of the average home. Furthermore if the conductor is long it definitely must be shielded to prevent noise pick up and to prevent undesired broadcasting of the local oscillator output of the receiver. Moreover the use of a long coupling cable prevents movement of the receiver unless a skilled installation man is available to relocate the same. Obviously a housewife who wishes to rearrange the furniture in her living room would not be very willing to permit the attachment to her receiver of an apparatus that would necessitate calling someone in each time she wished to rearrange her room. With most of the prior art devices it was necessary to have one complete and independent instrument for each receiver the use of which was to be metered or monitored thus requiring much duplication of equipment in a multi-receiver home.

It is an object of the present invention therefore to at least in part obviate the above mentioned disadvantages of prior art devices and systems for recording the transmitting stations to which one or more wave signal receivers were tuned.

It is another object of the present invention to provide an improved apparatus and an improved system of the character described which provides for recording the tuning condition of a plurality of wave signal receivers with a relatively small amount of apparatus, the majority of which may be located at a point remote from the receivers being monitored.

It is a further object of the present invention to provide a new and improved arrangement for use with any receiver of the superheterodyne type including simple and compact facilities which may be installed within the available space in the cabinets of most wave signal receivers for receiving a search signal generated at a remote point and transmitting a response to the remote point uniquely representative of the particular transmitting station to which the wave signal receiver is tuned for program reception.

Still another object of the present invention is to provide a new and improved apparatus for producing information relative to the particular transmitting station to which a wave signal receiver is tuned including means for scanning the frequency spectrum in a stepwise fashion in a series of discrete frequency steps together with means for producing an indication of the particular transmitting station to which said receiver is tuned.

Still a further object of the present invention is to provide apparatus and an improved system of the character described in which the apparatus associated with the receiver being monitored is of very small bulk and furthermore does not include accurate frequency measuring equipment.

A still further object of the present invention is to provide means for generating a variable frequency signal at a point preferably remote from the wave signal receiver being monitored for producing a distinctive response which is recordable and indicative of the tuning condition of the wave signal receiver.

Another object of the present invention is to provide an apparatus which may be employed with any wave signal receiver of the superheterodyne type and which furthermore is simple and compact so that a recording of the tuning condition of the receiver with respect to time may be made at a point remote from the receiver.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which Figs. 1a and 1b are diagrammatic illustrations showing a first and second portion arranged so as to be united into a single disclosure for illustrating the details of a system and apparatus embodying the present invention.

Fig. 4 is a block diagram of a system and apparatus similar to Fig. 1 illustrating the application thereof to a multi-receiver home.

Figure 1A:
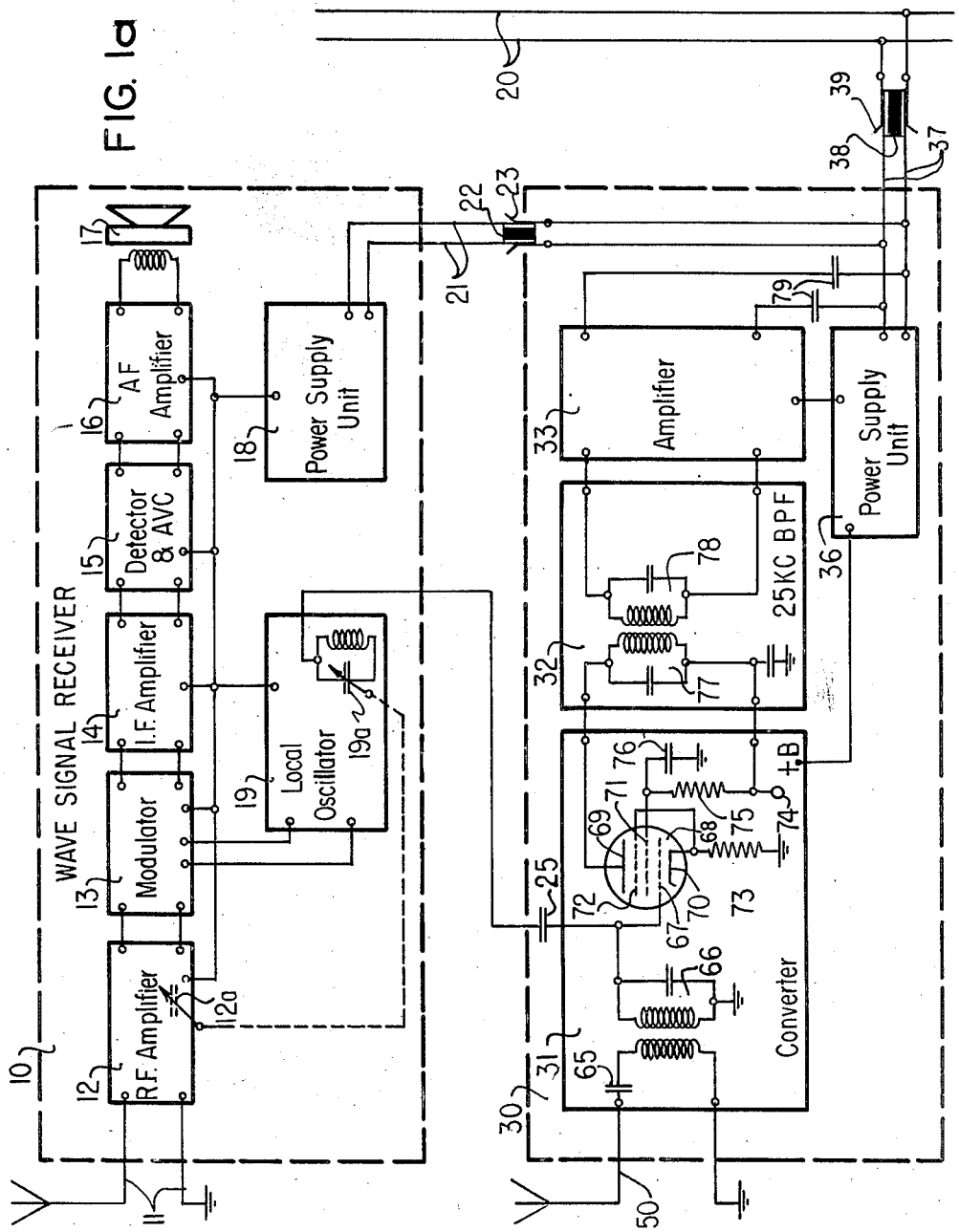

In accordance with the present invention there is provided what might be termed a search signal type of apparatus for metering or monitoring a wave signal receiver to produce a record with respect to time of the tuning condition of such receiver. An externally generated search signal preferably generated remote from the receiver is created; which search signal as the name implies reaches or scans a frequency spectrum, which bears a predetermined relationship to the frequency spectrum receivable by the wave signal receiver being monitored. The variable frequency search signal which may either be continuously or discontinuously variable is receivable by a broad band receiver disposed in a receiver attachment associated with the wave signal receiver being monitored and is combined in a converter with the output of the local oscillator of the wave signal receiver so as to produce a beat frequency signal which might be termed an intermediate frequency signal. When this intermediate frequency signal has a predetermined value from the standpoint of frequency it is capable of being transmitted by suitable means to the central station where the search signal generator is preferably located and where a record of the response with reference to its position of occurrence during the search signal cycle is made so as to be indicative of the tuning condition of the wave signal receiver.

It should be understood that the present invention is particularly applicable for monitoring the receivers in a multi-receiver home as is shown in Fig. 4 of the drawings. However, the apparatus is equally applicable for use in a single receiver home.

Referring now to Fig. 1 of the drawings there is disclosed and described hereinafter a system and apparatus for determining the listening habits of wave signal receiver users. In order to aid in understanding the system and apparatus referred to above consideration is first given to the wave signal receiver generally designated at 10 and which may comprise any wave signal receiver of the superheterodyne type including frequency modulation receivers as well as those for receiving amplitude modulated signals.

The wave signal receiver 10 is illustrated in block diagram and essentially comprises an antenna ground circuit 11, a radio frequency selector and amplifier unit 12, a modulator unit 13, an intermediate frequency amplifier unit 14, a detector and automatic volume control unit 15, an audio frequency amplifier unit 16, and a signal reproducer or loud speaker 17 connected in tandem in the order named. In addition the wave signal receiver 10 includes a power supply unit 18 and a local oscillator unit 19. The power supply unit 18 is connected to the units 12, 13, 14, 15, 16 and 19 in the manner indicated while the local oscillator 19 is connected to the modulator unit 13 in a manner well understood by those skilled in the art. The radio frequency amplifier unit 12 and the local oscillator 19 each comprise a resonant frequency varying device schematically indicated as variable condensers designated by the reference numerals 12a and 19a respectively in Fig. 1a of the drawings. These condensers 12a and 19a are illustrated as arranged for gang operation in the conventional manner of modern receivers. It will be apparent that the resonant frequency varying means might comprise permeability tuning means, instead of the illustrated variable condensers.

It will be understood that the power supply unit 18 is for the purpose of supplying filament current to the various sections or units of the wave signal receiver 10 as well as screen and anode potentials for the electron discharge valves provided in the various stages. The power supply unit 18 is illustrated as being excited from the usual 110-volt alternating current source specifically designated at 20 through a power supply cord 21 and the conventional plug connector including the plug 22 and the socket 23. It will furthermore be understood that the power source 20 forms a part of the current distribution system for the dwelling in which the wave signal receiver 10 is located and the conductors of the distribution circuit extend to or are parallel connected with other conductors in different rooms of the dwelling under consideration.

In general the receiver 10 described above is entirely conventional in arrangement and its mode of operation is well understood by those skilled in the art. The receiver 10 might be used to receive one or more of the following types of signals: amplitude modulation, frequency modulation or television signals. In any event program modulated signal carriers which are intercepted by the antenna ground circuit 11 are selectively transmitted through the various stages of the receiver wherein they are selected and amplified by the tunable radio frequency amplifier 12 converted into a modulated carrier of fixed frequency at the mixer or modulated stage 13, further amplified in the intermediate frequency amplifier 14 and detected in the detector stage 15. The detected audio or modulation components developed in the detector stage 15 are amplified by the audio frequency amplifier 16 and delivered to the radio loud speaker for signal reproduction. Automatic gain control of one or more of the receiver stages such as 12, 13, and 14 under the control of the gain control bias developed in the unit 15 is accomplished in an entirely conventional manner. Selection of different desired program modulated signal carriers originating in different transmitting stations is of course accomplished by adjustment of the tuning elements schematically indicated at 12a and 19a.

With superheterodyne receivers of the type illustrated in Fig. 1a of the drawings the reception of any program carrier from a given wave signal transmitter will be represented by a definite output frequency of the local oscillator 19. It will be apparent that these output frequency signals of the local oscillator 19 may be used to identify the particular transmitting stations to which the receiver is tuned for program reception at any particular time. If the wave signal receiver 10 were employed for the standard broadcast band for example having a generally accepted range of 540 to 1550 kc. then if the intermediate frequency were assumed to be 455 kc. the output of the local oscillator might be within the frequency range of 995 to 2005 kc.

In accordance with the present invention the output of the local oscillator 19 is supplied through a suitable coupling capacitor 25 to a unit generally designated as 30 which is preferably referred to hereinafter as the receiver attachment since it is associated with the wave signal receiver 10 as will become apparent as the following description proceeds. The receiver attachment 30 comprises apparatus of very small bulk having no moving parts so that it is readily capable of being disposed in the available cabinet space in most wave signal receivers. Furthermore the apparatus is of a type so that jarring or rough handling due to moving the receiver when rearranging the room for example, will not impair its operation in any way. It might be stated that the receiver attachment is essentially non-precision apparatus from the standpoint of not including delicate recording instruments and the like which heretofore were normally required in the apparatus associated with the wave signal receiver.

Before further discussing the receiver attachment 30 it might be mentioned that the apparatus disclosed and described in this application is preferably disposed in a single home of either the single or multi-receiver type. In actual practice several hundred receivers located in homes within the radiation areas of various wave signal transmitters which are broadcasting particular programs of interest are monitored to provide information concerning the listening habits of the receiver users necessary to a statistical analysis from which the various factors affecting the sales effectiveness of particular programs may be accurately arrived at. In using the system it is contemplated that selection of the system collaborator homes—that is the homes in which wave signal receiver user is to be logged—shall be on a basis such that all of the variable factors as for example, the number of potential listeners, economic affluence, religion, etc. which normally affect any process of sampling public opinion, are accounted for on a weighted basis. In the interests of simplifying the disclosure the apparatus for only a single receiver home and a multi-receiver home are shown in the drawings.

The receiver attachment 30 is in some respects a form of superheterodyne receiver in that it includes a converter stage 31 for receiving the output frequency of the local oscillator 19 and converting it to a particular frequency. If this particular frequency is of a predetermined value it is capable of being passed by a band pass filter generally designated at 32 connected to the output of the converter 31. The response or output of the band pass filter 32 is amplified by a suitable amplifier 33 and is adapted to be transmitted by suitable means to a central station specifically designated in Fig. 1b of the drawings by the reference numeral 35 and preferably located at a remote point such for example as the basement or closet of the home in which the wave signal receiver 10 is disposed. The receiver attachment 30 also includes a power supply unit 36 which is connected by a suitable power cord 37 and a connector comprising the plug 38 and the socket 39 with the power line 20. In order that the receiver attachment may readily be associated with the wave signal receiver 10 the socket 23 mentioned above is preferably a part of the receiver attachment 30 so that when attaching the receiver attachment to a wave signal receiver 10 the power cord 21 of the wave signal receiver is connected to the socket 23 of the receiver attachment instead of directly to the power source 20 and the power cord 31 of the receiver attachment is directly plugged into the power source 20. The only other connection between the wave signal receiver 10 and the receiver attachment 30 is the signal path to the converter 31 from the local oscillator section 19 through the coupling capacitor 25 mentioned above.

Before completing the description of the receiver attachment attention is directed to the central station 35 preferably disposed at a point remote from the wave signal receiver 10. In accordance with the present invention the central station 35 includes a unit generally designated at 38 which may be referred to as a search signal generator. This term search signal generator is employed since this unit 38 of the central station 35 is capable of producing a variable frequency signal either continuously or discontinuously variable in frequency which effectively scans the frequency spectrum in a predetermined manner. As will become apparent as the following description proceeds, the range of frequencies of the signals produced by the search signal generator 38 bears a predetermined relationship to the range of output frequency of the local oscillator 19.

As illustrated the search signal generator 38 comprises an oscillator of any suitable form specifically illustrated as an electron coupled oscillator comprising the pentode 39 having an anode 40, a cathode 41, a control grid or electrode 42, a screen grid 43 and a suppressor grid 44. The plate circuit of the pentode 39 comprises a radio frequency choke coil 45 which is connected to a source of +B potential represented by the conductor 46 through a voltage dropping resistor 47. The plate circuit of the pentode 42 is also coupled by means of a coupling capacitor 48 with a suitable link for transmitting or conducting the output of the search signal generator to the receiver attachment 30. It will be understood that such a link might be either a solid conductor link, one of the many coupling arrangements such as electrostatic or electromagnetic, or as illustrated, a space link including the antenna 49 connected to the capacitor 48. When a space link is employed as illustrated the converter 31 of the receiver attachment 30 is also provided with an antenna 50 for receiving signals produced by the remotely located search signal generator 35. As illustrated the suppressor grid 44 is grounded while the screen grid 43 is connected to the source of +B potential through a voltage dropping resistor 51 and the voltage dropping resistor 47. A suitable by-pass capacitor 52 may be provided to effectively connect the screen grid 43 to ground for high frequencies. For the purpose of producing the variable frequency search signal a tank circuit 54 is provided which comprises a parallel arranged inductance 55 and a variable capacitor 56. As illustrated the capacitance of the capacitor 56 is continuously varied by having the rotor thereof drivingly connected, as by means of the schematically indicated shaft 57 to a synchronous motor unit 58. The arrangement is preferably such that the rotor plates of the capacitor 56 are rotated at one revolution per minute. It will be understood that the capacitor 56 should be one in which the change of frequency with rotation of the rotor plates is a linear change. One terminal of the tank circuit is grounded as indicated at 59. The other terminal of the tank circuit 54 is coupled by means of a coupling capacitor 60 to the control grid 42 of the pentode 39. The cathode 41 is connected to an intermediate point or terminal 55a on the inductance 55 of the tank circuit 54. A grid leak resistor 61 is connected across the grid to cathode circuit and the magnitude of the resistance of this resistor and the cathode connection to the inductance 55 are adjusted for proper oscillator action. With this arrangement it will be apparent that continuous operation of the synchronous motor 58 will cause the search signal generator 38 to apply a search signal having a continuously variable frequency during each one-minute period to the transmitting antenna 49 so as to be receivable by the receiver unit effectively provided in the receiver attachment 30.

For the purpose of producing a response in the receiver attachment 31 indicative of the tuning condition of the wave signal receiver 10 which response may be transmitted for recording purposes to the central station 35 the range of frequencies of the search signal generator 38 is preferably chosen so as to differ by the range of frequencies produced by the local oscillator 19 by a predetermined constant amount which hereinafter will be designated as the beat frequency. Preferably this beat frequency is one well outside the audio frequency range so as to have no adverse effect on the wave signal receiver 10. By way of example in Figs. 1a and 1b of the drawings this beat frequency has been chosen to have a value of 25 kc. If as was assumed above that the wave signal receiver 10 is a standard broadcast band receiver having an intermediate frequency of 455 kc. so that the local oscillator has a frequency range of 995 to 2005 kc. then the search signal generator will have an output frequency range of 1020 to 2025 kc. As illustrated the antenna 50 is connected by means of the coupling capacitor 65 and the tuned circuit 66, which is a broad band tuned circuit so as to be capable of passing the range of frequencies of the search signal generator 38, to the control electrode 67 of a pentode 68 which acts as a mixer or converter tube in the converter stage 31. As illustrated the output of the local oscillator 19 is also connected by means of the coupling capacitor 25 of the control electrode 67 of the pentode 68. The pentode 68 further includes an anode 69, a cathode 70, a screen grid 71 and a suppressor grid 72. The cathode 70 is grounded through a suitable resistor 73 and as illustrated the suppressor grid 72 is directly connected to the cathode 70. The screen grid 71 is connected to a source of +B potential indicated at 74 through a voltage dropping resistor 75. A suitable high frequency by pass condenser 76 is provided to connect the screen grid 71 to ground for high frequencies. The plate circuit of the pentode 68 is connected to the source 74 of +B potential through the tuned circuit generally indicated at 77 which forms a part of the band pass filter 32. It will be apparent that a beat frequency current will flow in the plate circuit of the pentode 68 and consequently in the tuned circuit 77 when the receiver 10 is turned on so that the local oscillator produces an output frequency and the search signal generator 38 also produces an output frequency. It will furthermore be apparent that due to the cyclic variation, once per minute, of the search signal frequency that the beat frequency output of the converter 31 will be variable in frequency. When the local oscillator 19 is producing a signal it will be apparent that the frequency of the signal will have a constant value for any tuning condition of the wave signal receiver 10 and consequently a variable frequency beat frequency is produced equal to the difference between the variable search signal frequency and the constant frequency output of the local oscillator 19.

In accordance with the present invention the band pass filter 32 is chosen to be a fairly sharply tuned band pass filter capable of passing substantially only signals of a predetermined frequency specifically indicated as 25 kc. This band pass filter is illustrated as including in addition to the tuned circuit 77 a tuned circuit 78, the output of which is coupled to the amplifier 33. It should be understood, however, that a tuned amplifier circuit might be employed instead of the separate band pass filter 32 and the amplifier 33. In either event no signal will appear at the output of the amplifier 33 except at the instant that the beat frequency at the output of the converter 31 is equal to 25 kc. The instant of occurrence of this 25 kc. response at the output of the amplifier 33 during the cycle of the search signal generator 38 is an indication of the particular station to which the wave signal receiver 10 is tuned.

For the purpose of producing a record of the 25 kc. response at the central station 35 it is necessary for this response to be transmitted to the central station 35 and a suitable link is provided to complete the circuit between the central station 35 and the receiver attachment 30. As illustrated the output of the amplifier 33 is connected through suitable coupling capacitors 79 with the power line 20 through the power cord 37 so that the 25 kc. response is superimposed on the power circuit. It will be apparent that this response will occur once during each cycle of the search signal generator and at an instant during the cycle when the beat frequency which is variable is substantially equal to 25 kc. It should be understood that any other suitable link between the receiver attachment and the central station other than the power circuit 20 might be employed such for example as a space link or any electro-magnetic or electrostatic coupling means. Preferably, however, the power line 20 is most satisfactory since it is already available in substantially all dwelling units and it is merely necessary to plug both the receiver attachment and the central station into the power circuit at spaced points in the dwelling.

As illustrated in the drawings therefore the central station 35 also includes a power supply unit 80 which is connected by a suitable power cord 81 and a plug connector 82 with the power line 20 which is specifically illustrated as having a dotted line section to indicate its remote relationship with the power line to which the receiver attachment 30 is connected. The power supply unit 80 is capable of producing the +B potential required for the plate and screen grid circuits of the search signal generator 38 and is connected thereto by means of the conductor 46. The power supply unit is also illustrated as being connected by means of the conductors 83 with the synchronous motor 58 which as has been mentioned above, is capable of rotating the shaft 57 and consequently the rotor plates of the variable condenser 56 at preferably one revolution per minute.

In order to obtain at the central station 35 a recordable response representative of the 25 kc. response superimposed on the power line 20 by means of the coupling capacitor 79 there is provided a 25 kc. path at the central station comprising a 25 kc. band pass filter 85, an amplifier 86, and a rectifier 87. The input to the 25 kc. band pass filter 85 is connected the power line by means of coupling capacitors 88 which prevent the 60-cycle power from affecting the 25 kc. channel. It will be apparent that whenever a 25 kc. response is produced at the output of the amplifier 33 that an amplified and rectified response is produced at the output of the rectifier 87 in the central station 35.

For the purpose of producing a record of the tuning condition of the wave signal receiver 10 there is provided at the central station 35 a suitable recorder generally designated by the reference numeral 90. It will be understood that any suitable recorder may be provided and the recorder 90 is illustrated by way of example only. As illustrated this recorder comprises a movable recording element 91 which is illustrated as a tape having sprocket holes adapted to be engaged by a suitable sprocket 92 driven by a synchronous motor and gear train unit 93 through a shaft 94. The synchronous motor unit 93 is preferably energized from the house wiring circuit 20 in a manner so as to be continuously energized regardless of whether the remainder of the apparatus at the central station 35 is energized or not thereby insuring continuous movement or at least movement in a predetermined manner of the recording element 91 at all times. It will be understood that the power supply unit 80 is preferably energized only when one of the wave signal receivers in the home being metered or monitored is turned on and suitable means for this purpose would normally be provided. Such means form no part of the present invention but may for example be similar to that disclosed in copending Scherbatskoy and Freeman application, Serial No. 781,990 filed concurrently with the present application and assigned to the same assignee as the present application. The recorder 90 further includes a tape supply spool 96 and a take up spool 97 together with suitable means for maintaining the tape in taut condition. With this arrangement it will be apparent that the recording element 91 moves either at a constant speed or in some predetermined manner with respect to time so that distances longitudinally of the record tape 91 will be indicative of the elapsed time assuming proper operation thereof.

To produce a record on the recording element 91 representative of the tuning condition of the wave signal receiver 10 there is provided a movable stylus 100 which is supported for arcuate movement about a pivot 101 so that the inscribing portion 101a thereof is adapted to move transversely of the tape or recording element 91. The stylus 100 is connected by a suitable link 102 and a crank 103 with the shaft 57 of the synchronous motor unit 58. It will be apparent that with this arrangement the position of the stylus 100 transversely of the recording element 91 will correspond to a particular position of the rotor plates of the variable condenser 56 or in other words to a particular frequency output of the search signal generator 38.

In order to produce the desired trace on the recording element 91 the stylus pivot 101 is supported from a movable carriage 104 mounted for limited movement about a pivot 105. A suitable spring 106 biases the carriage 104 in such a manner that the inscribing portion 101a of the stylus 100 is normally not in trace producing engagement of the recording element 91. A portion of the carriage 104 forms the armature of an electromagnet including the winding 107 which is connected to the output of the rectifier 87 described above. Whenever the search signal generator 38 produces a signal the frequency of which differs by 25 kc. from the frequency output of the local oscillator 19 a beat frequency response is produced in the receiver attachment 31 which is capable of being transmitted to the central station 35 through the 25 kc. channel to energize the winding 107 of the electro-magnet and to cause the inscribing portion 101a of the stylus 109 to move into trace producing engagement with the recording element 91. Since the position of the trace produced transversely of the recording element 91 will be indicative of the particular frequency produced at that instant by the search signal generator 38 which bears a predetermined relationship to the output of the local oscillator at that instant a relatively simple means for recording the tuning condition of the wave signal receiver 10 is produced.

It will be apparent that a signal path in loop form is provided between the receiver attachment 30 and the central station 35. This circuit includes the space link between the antennas 49 and 50 which might be some other form of link as was mentioned above and also the conductor link between the amplifier 33 and the 25 kc. band pass filter 85 which might also be some other form of link.

In view of the detailed description set forth above the operation of the arrangement described above will be understood by those skilled in the art. Briefly however, when the wave signal receiver 10 is turned on, as when the receiver is tuned for the reception of a particular radiated carrier, a signal of a predetermined frequency which for the standard broadcast band might be in the range of 995 to 2005 kc. is produced by the local oscillator 19. For a particular station tuned in this local oscillator signal will have a predetermined frequency directly indicative of the frequency of the transmitting station tuned in. The central station 35 is either energized continuously or preferably is energized when the wave signal receiver 10 is turned on so that a search signal of variable frequency is produced, which frequency variation preferably occurs in cyclic fashion once per minute. This search signal is received by the broad band superheterodyne receiver in the receiver attachment 30 so as to produce a variable beat frequency with the output of the local oscillator 19. At the instant that this beat frequency is equal to 25 kc. or some other desired value, preferably widely removed from the audio range of frequencies, a transmittable response is produced which is transmitted to the central station 35 to actuate the recorder 90. Since the stylus 100 of the recorder 90 is operatively related with the means for varying the frequency of the search signal generator a record is produced not only indicative of the particular tuning condition of the wave signal receiver 10, but also the particular tuning condition with respect to time.

Figure 2:
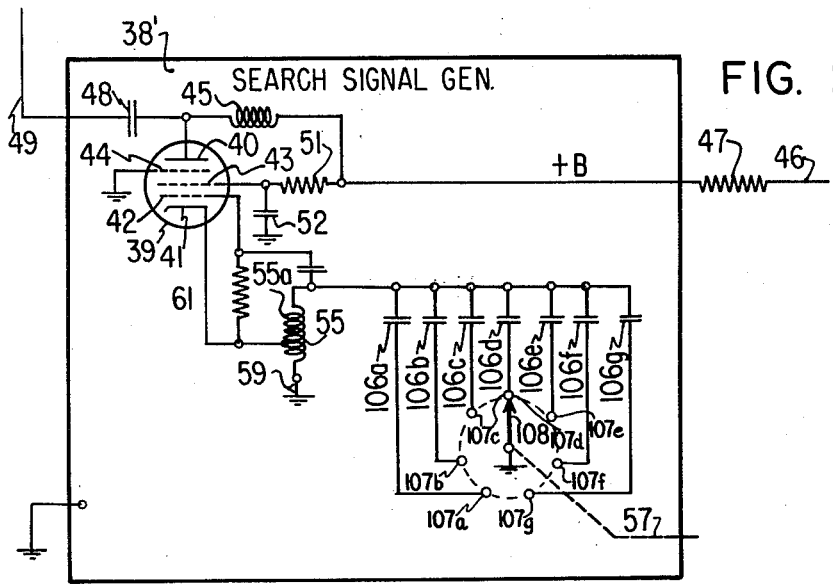
Fig. 2 is a schematic diagram of a modified portion of the apparatus of Fig. 1b.

Although there has been described an arrangement in which the search signal generator 38 produces a continuously variable output frequency it should be understood that the frequency spectrum might also be scanned in a stepwise fashion in a finite number of steps each step corresponding to a transmitting station likely to be tuned in by the wave signal receiver 10. It will be understood that in any particular locality the number of transmitting stations to which a receiver is generally tuned is fairly limited. One factor which limits the number of the transmitting stations which are likely to be tuned in by the receiver is of course the relative ranges of the receiver and transmitting stations. In addition the advantageous reception obtainable from a finite number of stations over the reception of other stations which might be tuned in but whose transmitting characteristics are not too favorable for good program reception mitigates against tuning the receiver to more than a limited number of transmitters. Accordingly there is illustrated in Fig. 2 of the drawings a search signal generator 38' for producing a search signal variable in frequency in a stepwise fashion each step bearing a predetermined relationship to the frequency of a transmitting station likely to be tuned in by the wave signal receiver. The corresponding parts of Fig. 2 are designated by the same reference numerals as in Fig. 1b of the drawings and the disclosure of Fig. 2 is such that the search signal generator 38' could be merely substituted for the search signal generator 38. As illustrated the search signal generator 38' differs from the search signal generator 38 only in that the variable capacitor 36 has been replaced by a plurality of capacitors of fixed capacitance value designated by the reference numerals 106a, 106b, 106c, 106d, 106e, 106f, and 106g. The capacitors each have a common terminal connected to the upper terminal of the inductance 55. The other terminals of the capacitors 106a to 106g respectively are connected to the contacts 107a, 107b, 107c, 107d, 107e, 107f, and 107g respectively of a rotary switch mechanism comprising the movable switch or contact arm 108. The contacts 107g are arranged about the circumference of a circle in equally spaced relationship and the contact arm 108 is preferably connected to the shaft 57 of the synchronous motor unit 58. Since each of the capacitors 106a has a different value of capacitance the rotary switch mechanism comprising the rotatable arm 108 successfully renders these capacitors effective whereby a search signal varying in frequency in a discontinuous or stepwise fashion is produced. It will be understood that only seven frequency steps are illustrated as being provided by the search signal generator 38' but more or less frequency steps could readily be provided by employing more or fewer capacitors 106 and contacts 107. As illustrated the movable switch arm 108 is connected to the ground terminal 59 in any suitable manner.

By employing a search signal generator of the type shown in Fig. 2 of the drawings there is eliminated any possibility of producing a variable pitch audible heterodyne note in the wave signal receiver 10. Also the possibility of double responses is eliminated. If desired, however, suitable lock out means for locking out the search signal generator 38 might be employed such for example as are disclosed and claimed in the above mentioned Scherbatskoy and Freeman application.

Figure 3:
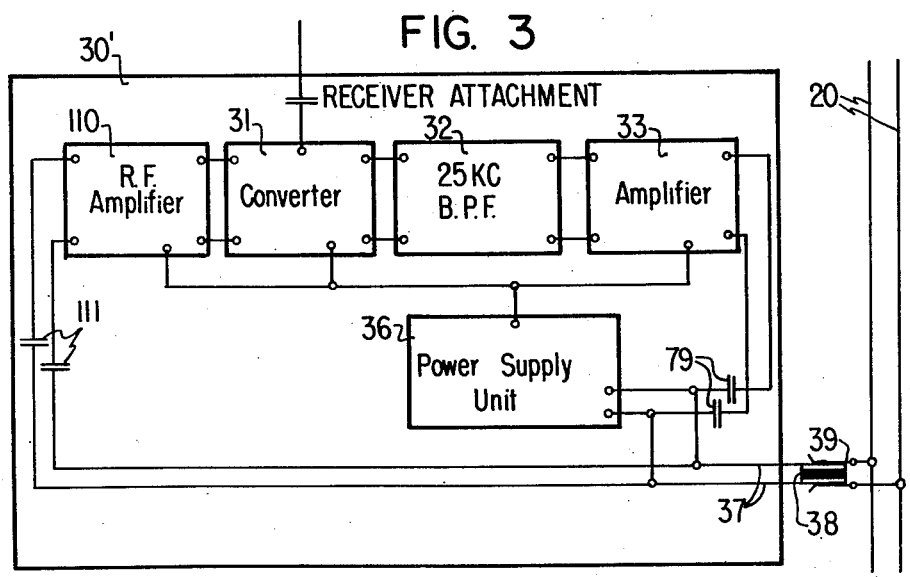
Fig. 3 is a modification of still another portion of the apparatus shown in Fig. 1a of the drawings.

In Fig. 3 of the drawings there is illustrated a modification of the receiver attachment 30 which is represented by the reference numeral 30'. The corresponding parts of Fig. 3 are designated by the same reference numerals as in Fig. 1a of the drawings. Essentially Fig. 3 differs from the preceding figures in only two respects. First of all the receiver attachment 30' of Fig. 3 is provided with a radio frequency amplifier 110 in the event that it is desirable to have a stronger response produced in the receiver attachment 30'. Fig. 3 also illustrates an arrangement in which the space link between the antennas 49 and 50 is eliminated and a conductor link in the form of the power circuits 20 is employed. To this end the input to the radio frequency amplifier 110 is illustrated as being connected to the power line 20 by means of suitable coupling capacitors 111 in the same manner that the output of the amplifier 33 of the receiver attachment 30 is connected to the power lines through the coupling capacitors 79.

The apparatus described above for recording the listening habits of wave signal receiver users is specifically applicable for use in multi-receiver homes with a great reduction in the amount of apparatus required. As a matter of fact regardless of the number of receivers in a multi-receiver home the equipment at the central station generally designated at 35' in Fig. 4 of the drawings is substantially identical with that shown in Fig. 1b of the drawings except for the addition of some band pass filters.

Referring now to Fig. 4 of the drawings where the corresponding parts thereof are designated by the same reference numerals as in the preceding figures there is illustrated a system for multi-receiver homes in which there are provided three wave signal receivers designated as 10a, 10b and 10c respectively. Associated with each of the wave signal receivers 10a, 10b and 10c respectively are receiver attachments 30a, 30b and 30c. These receiver attachments are identical in every respect to the one shown in Fig. 1a of the drawings except that band pass filters having variable pass bands are employed. As illustrated in the receiver attachment 30a a 25 kc. band pass filter is employed which is designated by the reference numeral 32a. The receiver attachment 30b is illustrated as having a 35 kc. band pass filter designated by the reference number 32b while the receiver attachment 30c is provided with a band pass filter having a pass band of 45 kc. designated by the reference numeral 32c. Each of the receiver attachments 30a, 30b and 30c are connected to the power line 20 in the same manner as in Fig. 1a of the drawings. The choices of the beat frequencies at which responses are produced at the output of the band pass filters is not important. Preferably the frequencies are between 25 and 50 kc. The power circuit 20 is illustrated as having numerous dotted line portions to indicate the remote relationship in a particular dwelling of the wave signal receivers and also the central station.

The central station 35' differs from the central station 35 in that the 25 kc. band pass filter 85 is replaced by three band pass filters 85a, 85b and 85c connected in parallel each corresponding with the band pass filter 32 marked with the same subscript. It will be apparent that with this arrangement a separate channel is provided around the loop circuit including the receiver attachment and the central station for the search signal and response produced for each receiver so that there is effectively superimposed on the power line 20 a response uniquely representative not only of the station tuned in by the wave signal receiver but also of the particular wave signal receiver under consideration. It will be apparent that with this arrangement a single recorder unit 90 is capable of recording the tuning condition of a plurality of receivers in a simple and expeditious manner. In order to provide information which will indicate which wave signal receiver is contributing to which trace it may be desirable to provide a plurality of additional receiver indicting styli in the recorder 90 one for each wave signal receiver, which styli are energized to produce a trace whenever the wave signal receiver associated therewith is turned on. Such an arrangement is disclosed in copending application Serial No. 7,647 filed February 11, 1948, now Patent 2,484,733 and assigned to the same assignee as the present application. With this arrangement if all three receivers are turned on as indicated by all three receiver indicating styli producing traces then if only a single trace is produced by the stylus 100 it will be apparent that all three receivers are tuned to the same transmitting station.

It will be apparent to those skilled in the art that the present invention is not limited to the particular constructions and arrangements shown and described but that changes and modifications can be made without departing from the spirit and scope of the present invention. It is aimed in the appended claims to cover all changes and modifications as fall within the true spirit and scope of the present invention.

What is claimed as new and desired to be secured by Letters Patent of the United States is:

1. In a device for determining the tuning condition of a tunable wave signal receiver, means located at a station remote from said receiver for generating and transmitting to said receiver a radio frequency signal of variable frequency, response producing means at said receiver for receiving said signal and including means for combining said signal with a signal derived from said receiver and uniquely representative of the tuning condition thereof to produce a variable frequency beat frequency signal, means for transmitting said beat frequency signal to said station, only when of a predetermined frequency value, and means at said station jointly responsive to the receipt of said transmittable beat frequency signal and the operation of said means for generating said radio frequency signal for recording the tuning condition of said receiver.

2. In a device for determining the tuning condition of a tunable superheterodyne wave signal receiver, means located at a station remote from said receiver for generating and transmitting to said receiver a radio frequency signal of variable frequency, means at said receiver for receiving said signal and combining it wth a signal obtained from the local oscillator of said receiver to produce a variable frequency beat frequency signal, means for transmitting said beat frequency signal to said station only when the frequency thereof has a predetermined value, and means at said station for recording the receipt of said transmittable beat frequency signal with reference to the frequency of said search signal at the instant of occurrence of said transmittable beat frequency signal so as to provide a record of the tuning condition of said receiver.

3. In a device for determining the tuning condition of a tunable wave signal receiver, means disposed at a station in the same dwelling where said receiver is located but at a point remote from said receiver for generating and transmitting to said receiver a radio frequency signal of variable frequency, means at said receiver for receiving said signal and combining it with a signal from said receiver representative of the tuning condition thereof to produce a variable frequency beat frequency signal, filter means for passing said beat frequency signal so as to produce a response at the output of said filter means only when of a predetermined frequency, means including the power distribution circuit of said dwelling for transmitting said response to said station, and means at said station for recording the receipt of said response with reference to the frequency of said search signal at the instant of the occurrence of said response so as to provide a record of the tuning condition of said receiver.

4. In a system for determining the frequency to which a tunable wave signal receiver is tuned, comprising a search signal generator located at a station remote from said receiver for producing a search signal cyclically variable in frequency in a predetermined manner during each cycle, means at said receiver for receiving said search signal and combining it with a signal from said receiver indicative of the tuning condition thereof to produce a variable frequency beat frequency signal, means for producing at said receiver a transmittable response at the instant during the search signal cycle that said beat frequency signal has a predetermined frequency value, means for transmitting a signal representative of said response to said station, and means at said station responsive to the signal representative of said response and correlated with said search signal generator for producing an indication of the frequency to which said receiver is tuned.

5. In a system for determining the frequency to which a tunable wave signal receiver of the superheterodyne type is tuned, comprising a search signal generator located at a station remote from said receiver for producing a search signal cyclically variable in frequency in a predetermined manner during each cycle of substantially one minute duration, means at said receiver for receiving said search signal and combining it with a signal derived from the local oscillator from said receiver to produce a variable frequency beat frequency signal, means for producing at said receiver a transmittable response at the instant during the search signal cycle that said beat frequency signal has a predetermined frequency value, means for transmitting a signal representative of said response to said station, and means at said station responsive to the signal representative of said response and correlated with said search signal generator for producing an indication of the frequency to which said receiver is tuned.

6. In a system for recording information relative to the particular radio transmitting stations to which a wave signal receiver is tuned, a frequency generator, selecting means for causing said generator to produce an output having a plurality of discrete frequencies each of which is related to the transmitting frequency of a different one of said radio transmitting stations, each discrete frequency differing from the transmitting frequency of its related radio transmitting station by a predetermined frequency, means for heterodyning a signal obtained from said wave signal receiver representative of any one of said radio transmitting stations with the output of said generator, means for operating said selective means to cause an output of said discrete frequencies to be produced successively during each cycle of operation and in constantly recurring cycles, whereby a beat frequency signal of a frequency equal to said predetermined frequency is periodically produced at the instant during each cycle when the output of said generator is of the frequency which differs from the frequency of the signal being received by said wave signal receiver by said predetermined frequency, and means responsive to the position in said cycle of operation that a beat frequency signal of said predetermined frequency is produced for producing on a recording element a record representative of the particular radio transmitting station to which said receiver is tuned.

7. In a system for producing for record purposes information relative to the particular radio transmitting stations to which a wave signal receiver is tuned, means for generating a variable frequency signal, selective means for causing said first mentioned means to produce a signal having a plurality of discrete frequencies each of which is related to the transmitting frequency of a different one of said radio transmitting stations, each discrete frequency differing from the transmitting frequency of its related radio transmitting station by a predetermined frequency, means for heterodyning a signal obtained from said wave signal receiver representative of any one of said radio transmitting stations with the signal produced by said first mentioned means, means for operating said selective means to cause a signal of said discrete frequencies to be produced successively during each cycle of operation and in constantly recurring cycles, whereby a beat frequency signal of a frequency equal to said predetermined frequency is periodically produced at the instant during each cycle when the output of said oscillator is of the frequency which differs from the frequency of the signal being received by said wave signal receiver by said predetermined frequency, and means responsive to the position in said cycle of operation that a beat frequency signal of said predetermined frequency is produced for producing an indication during each scanning cycle representative of the particular radio transmitting station to which said receiver is tuned.

8. A system for monitoring a wave signal receiver capable of selectively receiving the radiated carriers from a plurality of transmitters, comprising a first station at which said receiver is located, a second station remote from said receiver and including means for generating and transmitting a first signal from said second station to said first station, means for deriving a second signal from said receiver having a characteristic indicative of the tuning condition of said receiver, means at said first station jointly responsive to the receipt of said first signal and to said second signal for producing a third signal the instant of occurrence of which within a predetermined unit of time is indicative of the tuning condition of said receiver, indicating means, and a signal channel for transmitting said third signal from said first station to said indicating means so that said indicating means provides an indication of the tuning condition of said receiver.

9. A system for monitoring a wave signal receiver of the superheterodyne type capable of selectively receiving the radiated carriers from a plurality of transmitters, comprising a first station at which said receiver is located, a second station remote from said receiver and including means for generating and transmitting a first signal from said second station to said first station, means for deriving a second signal from the local oscillator of said receiver having a characteristic indicative of the tuning condition of said receiver, means at said first station jointly responsive to the receipt of said first signal and to said second signal for producing a third signal the instant of occurrence of which within a predetermined unit of time is indicative of the tuning condition of said receiver, indicating means, and a signal channel for transmitting said third signal from said first station to said indicating means so that said indicating means provides an indication of the tuning condition of said receiver.

10. A system for monitoring a wave signal receiver of the superheterodyne type capable of selectively receiving the radiated carriers from a plurality of transmitters and including a local oscillator, comprising a first station at which said receiver is located, a second station remote from said receiver and including means for generating and transmitting a first signal from said second station to said first station, means for deriving a second signal from said local oscillator having a frequency characteristic indicative of the tuning condition of said receiver, means at said first station jointly responsive to the receipt of said first signal and to said second signal for producing a third signal the instant of occurrence of which within a predetermined unit of time is indicative of the tuning condition of said receiver, indicating means, and a signal channel for transmitting said third signal from said first station to said indicating means so that said indicating means provides an indication of the tuning condition of said receiver.

11. In an arrangement for indicating the tuning condition of a wave signal receiver capable of selectively receiving the radiated carriers from a plurality of transmitters, comprising a first station at which said receiver is located, a second station remote from said receiver and including means for generating and transmitting a first signal from said second station to said first station, a separate fixed tuned receiver at said first station for receiving said first signal, means for deriving a second signal from said wave signal receiver, means at said first station responsive jointly to the receipt of said first signal by said fixed tuned receiver and to said second signal for producing a third signal the instant of occurrence of which with reference to a predetermined instant of time is indicative of the tuning condition of said wave signal receiver, indicating means, and means for transmitting said third signal from said first station to said indicating means whereby the tuning condition of said wave signal receiver may be determined from said indicating means.

12. In an arrangement for indicating the tuning condition of a superheterodyne type of wave signal receiver capable of selectively receiving the radiated carriers from a plurality of transmitters and including a local oscillator, comprising a first station at which said receiver is located, a second station remote from said receiver and including means for generating and transmitting a first signal from said second station to said first station, a separate fixed tuned receiver at said first station for receiving said first signal, means for deriving a second signal from said local oscillator indicative of the tuning condition of said receiver, means at said first station responsive jointly to the receipt of said first signal by said fixed tuned receiver and to said second signal for producing a third signal the instant of occurrence of which with reference to a predetermined instant of time is indicative of the tuning condition of said wave signal receiver, indicating means, and means for transmitting said third signal from said first station to said indicating means whereby the tuning condition of said wave signal receiver may be determined from said indicating means.

13. In a system for determining the channel to which a tunable wave signal receiver is tuned for the reception of a desired radiated carrier, a first station, a receiver attachment associated with said tunable receiver disposed at said first station and including a fixed tuned receiver, a second station remote from said first station, a signal generator disposed at said second station for producing a first signal, means for transmitting said first signal to said fixed tuned receiver, means including a step switching device at one of said stations for performing a plurality of successive switching functions during one cycle of operation thereof, each step of said step switching device being representative of a particular channel to which said tunable wave signal receiver is capable of being tuned, means responsive to the receipt of a signal by said fixed tuned receiver and the operation of said switching device to perform a predetermined one of said switching functions for producing a momentary distinctive signal, the instant of occurrence of said distinctive signal within said cycle of operation being representative of the particular channel to which said tunable wave signal receiver is tuned, and means for producing an indication representative of said distinctive signal.

14. In a system for determining the channel to which a tunable wave signal receiver of the superheterodyne type is tuned for the reception of a desired radiated carrier, a first station, a receiver attachment associated with said tunable receiver disposed at said first station and including a fixed tuned receiver, a second station remote from said first station, a means disposed at said second station for producing a first signal, means for transmitting said first signal to said fixed tuned receiver, means for deriving a second signal having variable characteristics uniquely representative of the tuning condition of said tunable receiver from the local oscillator of said tunable receiver, means including a step switching device at one of said stations for performing a plurality of successive switching functions during one cycle of operation thereof, each step of said step switching device being representative of a particular channel to which said tunable wave signal receiver is capable of being tuned, means responsive to a predetermined positioning of said step switching device and the concurrent derivation of a predetermined second signal from said local oscillator for producing a momentary distinctive signal, the instant of occurrence of said distinctive signal within said cycle of operation being representative of the particular channel to which said tunable wave signal receiver is tuned, and means for producing an indication representative of said distinctive signal.

15. In apparatus for determining the tuning condition of a tunable wave signal receiver for the reception of a desired radiated carrier, a receiver attachment disposed physically adjacent said tunable receiver including a fixed tuned receiver, means located at a station remote from said tunable receiver including means for producing a signal receivable by said fixed tuned receiver, response producing means responsive to a signal derived from said tunable receiver and said signal received by said fixed tuned receiver for producing a distinctive response in said receiver attachment, an indicating means, and means for transmitting a signal representation of said response to said indicating means upon the occurrence of said response to produce an indication of the tuning condition of said receiver.

16. In a system for determining the channel to which a tunable wave signal receiver of the superheterodyne type is tuned for the reception of a desired radiated carrier, a first station, a receiver attachment associated with said tunable receiver disposed at said first station and including a fixed tuned receiver, a second station remote from said first station, a means disposed at said second station for producing a first signal, means for transmitting said first signal to said fixed tuned receiver, means for deriving a second signal having variable characteristics uniquely representative of the tuning condition of said tunable receiver from the local oscillator of said tunable receiver, means including a step switching device at one of said stations for performing a plurality of successive switching functions during one cycle of operation thereof, each step of said step switching device being representative of a particular channel to which said tunable wave signal receiver is capable of being tuned, means responsive to a predetermined positioning of said step switching device and the concurrent derivation of a predetermined second signal from said local oscillator for producing a momentary distinctive signal, the instant of occurrence of said distinctive signal within said cycle of operation being representative of the particular channel to which said tunable wave signal receiver is tuned, an indicating means disposed at a point remote from said first station, and means for transmitting said distinctive signal to said indicating means to produce an indication representative of the channel to which said tunable wave signal receiver is tuned.

17. In apparatus for determining the tuning condition of a superheterodyne type of tunable wave signal receiver for the reception of a desired radiated carrier, a receiver attachment associated with said tunable receiver including a fixed tuned receiver, means located at a station remote from said tunable receiver including means for producing a signal receivable by said fixed tuned receiver, means responsive to a signal derived from the local oscillator of said tunable receiver and said signal received by said fixed tuned receiver for producing a distinctive response in said receiver attachment, an indicating means, and means for transmitting a signal representative of said response to said indicating means upon the occurrence of said response to produce an indication of the tuning condition of said receiver.

18. In combination with a wave signal receiver which is tunable over a predetermined frequency range selectively to receive signals radiated by different transmitters operating at different carrier frequencies within said range, means located at a station remote from said receiver for producing a variable frequency search signal, means for transmitting said search signal to said receiver, means coupled to said receiver and responsive to said search signal for producing a distinctive response signal at the particular instant when the frequency of said search signal bears a predetermined relationship to the carrier frequency of the transmitter to which said receiver is tuned for signal reception, means for transmitting a signal representative of said response signal back to said station, and means at said station responsive to the signal representative of said response signal for producing an indication of the tranmitting station to which said receiver is tuned for signal reception.

19. In combination with a wave signal receiver which is tunable over a predetermined frequency range selectively to receive signals radiated by different transmitters operating at different carrier frequencies within said range, a generator for cyclically generating a variable frequency search signal, means included in said generator for causing the frequency of said search signal to vary in a stepwise fashion during each frequency change cycle of said generator, the frequency produced by said generator at each step thereof being related in a predetermined manner to the carrier frequency of a different one of said transmitters, means for intermodulating said search signal with a signal developed in said receiver and related in a predetermined manner to the carrier frequency of the transmitter to which said receiver is tuned for signal reception, whereby a beat frequency response signal is produced, the instant of occurrence of said response signal during the frequency change cycle of said generator being indicative of the particular transmitter to which said wave signal receiver is tuned for signal reception, and means responsive to the instant of occurrence of said response signal in said frequency change cycle for producing an indication of the transmitter to which said receiver is tuned for signal reception.

HENRY A. RAHMEL.

References Cited in the file of this patent

UNITED STATES PATENTS

| Number | Name | Date |
|---|---|---|
| 1,993,395 | Beers | Mar. 5, 1935 |
| 2,093,855 | Taylor | Sept. 21, 1937 |
| 2,249,324 | Potter | July 15, 1941 |
| 2,275,460 | Page | Mar. 10, 1942 |
| 2,283,523 | White | May 19, 1942 |
| 2,344,562 | Potter | Mar. 21, 1944 |
| 2,418,750 | Bliss et al. | Apr. 8, 1947 |
| 2,421,106 | Wight et al. | May 27, 1947 |
| 2,479,208 | Byrne et al. | Aug. 16, 1949 |